(12) United States Patent
Maeda

(10) Patent No.: US 8,304,472 B2
(45) Date of Patent: Nov. 6, 2012

(54) PROCESS FOR PRODUCTION OF CONDUCTIVE RESIN COMPOSITION

(75) Inventor: Mutsumi Maeda, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 0 days.

(21) Appl. No.: 12/294,124

(22) PCT Filed: May 12, 2006

(86) PCT No.: PCT/JP2006/309555
§ 371 (c)(1),
(2), (4) Date: Sep. 23, 2008

(87) PCT Pub. No.: WO2007/132504
PCT Pub. Date: Nov. 22, 2007

(65) Prior Publication Data
US 2009/0212264 A1    Aug. 27, 2009

(51) Int. Cl.
*C08J 3/22* (2006.01)
(52) U.S. Cl. ............ 523/351; 523/1; 252/511; 252/512; 524/495; 524/496
(58) Field of Classification Search ............... 252/500, 252/511; 524/495, 496; 523/1, 351
See application file for complete search history.

(56) References Cited

U.S. PATENT DOCUMENTS

| | | | |
|---|---|---|---|
| 5,741,846 | A | 4/1998 | Lohmeijer et al. |
| 6,942,823 | B2 | 9/2005 | Terada et al. |
| 7,182,888 | B2 | 2/2007 | Terada et al. |
| 7,220,795 | B2 | 5/2007 | Miyoshi et al. |
| 7,540,980 | B2 | 6/2009 | Noda et al. |
| 2003/0092824 | A1 | 5/2003 | Bastiaens et al. |
| 2003/0116757 | A1 | 6/2003 | Miyoshi et al. |
| 2003/0134963 | A1 | 7/2003 | Miyoshi et al. |
| 2006/0199903 | A1 | 9/2006 | Miyoshi et al. |
| 2007/0205401 | A1 | 9/2007 | Terada et al. |
| 2009/0029138 | A1 | 1/2009 | Miyoshi et al. |
| 2009/0057621 | A1 | 3/2009 | Keulen et al. |
| 2009/0194225 | A1 | 8/2009 | Ikuta |
| 2010/0155673 | A1 | 6/2010 | Noda et al. |

FOREIGN PATENT DOCUMENTS

| | | |
|---|---|---|
| EP | 0 506 386 | 9/1992 |
| EP | 1 923 419 A1 | 5/2008 |
| JP | 2-201811 | 8/1990 |
| JP | 4-300956 | 10/1992 |
| JP | 8-48869 | 2/1996 |
| JP | 2004 002898 A | 1/2004 |
| JP | 2004 143239 | 5/2004 |
| JP | 2004-143240 | 5/2004 |
| JP | 2005-179547 | 7/2005 |
| JP | 2005-264100 | 9/2005 |
| JP | 2005-298545 | 10/2005 |
| WO | 2005/026260 | 3/2005 |

OTHER PUBLICATIONS

Office Action mailed Sep. 16, 2009 in U.S. Appl. No. 12/464,664.
English Language Abstract of JP 2005-298545.
English Language Abstract of JP 2005-264100.
English Language Abstract of JP 2005-179547.
English Language Abstract of JP 2004-143240.
English Language Abstract of JP 2-201811.
English Language Abstract of JP 4-300956.
English Language Abstract of JP 8-48869.
European Search Report for EP 09159869, mailed Oct. 14, 2009.
European Search Report issue with respect to counterpart European Application No. 06732536.5, dated May 30, 2012.

*Primary Examiner* — Mark Kopec
*Assistant Examiner* — Haidung Nguyen
(74) *Attorney, Agent, or Firm* — Greenblum & Bernstein, P.L.C.

(57) ABSTRACT

A method for producing a conductive polyamide-polyphenylene ether resin composition comprising (A) 10 to 90 parts by mass of a polyphenylene ether resin, (B) 5 to 85 parts by mass of a polyamide having a (terminal amino group)/(terminal carboxyl group) ratio falling within the range from 0.20 to 4.0, (C) 5 to 85 parts by mass of a polyamide having a (terminal amino group)/(terminal carboxyl group) ratio falling within the range from 0.05 to 0.19 and (D) 0.1 to 10 parts by mass of a conductive filler, the method comprising the step of melt-kneading of the component (A), the component (B), a compatibilizer (F) and a master batch (E) obtained by melt-kneading of the component (D) and the component (C) in advance.

12 Claims, No Drawings

PROCESS FOR PRODUCTION OF CONDUCTIVE RESIN COMPOSITION

TECHNICAL FIELD

The present invention relates to a conductive polyamide-polyphenylene ether resin composition excellent in balance of mechanical properties and fluidity, and a production method thereof.

BACKGROUND ART

Conductive polyamide-polyphenylene ether resin compositions are excellent in processability and productivity, products/parts having desired shapes can be efficiently produced therefrom by molding methods such as injection molding and extrusion molding, and thus-obtained molded articles are electrostatic painted in a good manner. Thus, they are used as materials for exterior automobile parts (see Patent Documents 1 and 2, for example).

However, conventionally disclosed arts require addition of a large amount of conductive filler for obtaining conductive polyamide-polyphenylene ether resin compositions and also requires addition of a large amount of elastomer for imparting sufficient impact resistance (see Patent Document 3, for example). Thus, conventional conductive resin compositions have, for example, a reduced rigidity, resulting in a limit on material design. The compositions have not yet expanded their applications as materials for products and parts of electronics and electricity, materials for construction, and materials for other industries.

Patent Document 1: JP-A-2-201811
Patent Document 2: JP-A-4-300956
Patent Document 3: JP-A-8-048869

DISCLOSURE OF THE INVENTION

Problem to be Solved by the Invention

In view of the above conventional problem, it is an object of the present invention to provide a technique for effectively dispersing a conductive filler in a polyamide-polyphenylene ether resin composition, and to provide a conductive polyamide-polyphenylene ether resin composition and a production method thereof, the composition being economical and excellent in balance of fluidity and mechanical properties such as impact resistance and rigidity in comparison with the conventional arts.

Means for Solving the Problem

The present inventor has made intensive studies on techniques for solving the above problem. As a result, the present inventor found that a production method for melt-kneading a master batch as a composition component containing: a polyamide (B) having a ratio of terminal amino groups to terminal carboxyl groups within a specific range; a polyamide (C) having a ratio of terminal amino groups to terminal carboxyl groups within a specific range different from the polyamide (B); and a conductive filler is employed as a method for producing a conductive polyamide-polyphenylene ether resin composition, and thereby a conductive polyamide-polyphenylene ether resin composition extremely excellent in balance among fluidity, conductivity, impact resistance and rigidity can be obtained. Thus, the present invention has been accomplished.

That is, the present invention includes:

1. A method for producing a conductive polyamide-polyphenylene ether resin composition comprising: 10 to 90 parts by mass of polyphenylene ether resin (A); 5 to 85 parts by mass of a polyamide (B) having a ratio of terminal amino groups to terminal carboxyl groups of 0.20 to 4.0; 5 to 85 parts by mass of a polyamide (C) having a ratio of terminal amino groups to terminal carboxyl groups of 0.05 to 0.19; and 0.1 to 10 parts by mass of a conductive filler (D), wherein the method comprising the step of melt-kneading of the component (A), the component (B), a compatibilizer (F) and a master batch (E) obtained by melt-kneading of the component (D) and the component (C) in advance.

2. The method as described in the above 1., wherein the method comprising melt-kneading of the component (A), the component (B) and the compatibilizer (F) in advance to obtain a polyamide-polyphenylene ether resin composition (G), and melt-kneading of the component (E) and the component (G).

3. The method as described in the above 1., wherein the method comprising melt-kneading of the component (A) and the component (F) in advance to obtain a functionalized polyphenylene ether resin composition (H), and melt-kneading of the component (B), the component (E) and the component (H).

4. The method as described in any one of the above 1. to 3., wherein a ratio of terminal amino groups to terminal carboxyl groups of the entire polyamide in the composition is 0.15 to 1.0.

5. The method as described in the above 4., wherein the ratio of terminal amino groups to terminal carboxyl groups of the entire polyamide in the composition is 0.16 to 0.7.

6. The method as described in the above 5., wherein the ratio of terminal amino groups to terminal carboxyl groups of the entire polyamide in the composition is 0.17 to 0.3.

Advantages of the Invention

The conductive polyamide-polyphenylene ether resin composition of the present invention imparts a good electrostatic painting property to an article molded therefrom by adding a small amount of a conductive filler, has a larger freedom for designing mechanical properties, and is economically excellent as compared to conventional art. In addition, the present invention can provide a method for effectively producing the resin composition.

BEST MODE FOR CARRYING OUT THE INVENTION

Hereinafter, the present invention is explained in detail.
[Conductive Polyamide-Polyphenylene Ether Composition]
<Polyphenylene Ether Resin (A)>

In the present invention, a polyphenylene ether resin (A) has a main chain structure represented by the following formula (1), and is a plastic material, which can provide products and parts in desired forms by a molding process such as melt injection molding or melt extrusion molding, and which has been widely used as a material for products and parts in the field of electricity and electronics, the field of automobiles and the field of various other industrial materials.

[Formula 1]

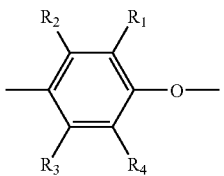

(1)

In the polyphenylene ether resin (A) of the present invention represented by the formula 1, $R_1$ and $R_4$ independently represent hydrogen, a primary or secondary lower alkyl, a phenyl, an aminoalkyl or a hydrocarbonoxy. $R_2$ and $R_3$ independently represent hydrogen, a primary or secondary lower alkyl or a phenyl.

The polyphenylene ether resin (A) of the present invention is a polymer or a copolymer having a reduced viscosity, measured by using a 0.5 g/dl chloroform solution at 30° C., of 0.15 to 0.70 dl/g, more preferably 0.20 to 0.70 dl/g.

Specific examples of the polyphenylene ether resin (A) of the present invention include poly(2,6-dimethyl-1,4-phenylene ether), poly(2-methyl-6-ethyl-1,4-phenylene ether), poly(2-methyl-6-phenyl-1,4-phenylene ether), and poly(2,6-dichloro-1,4-phenylene ether).

Other specific examples of the polyphenylene ether resin (A) of the present invention include a polyphenylene ether copolymer such as a copolymer of 2,6-dimethylphenol with other phenols (for example, 2,3,6-trimethylphenol and 2-methyl-6-butylphenol).

Among the above polyphenylene ether resin (A) of the present invention, poly(2,6-dimethyl-1,4-phenylene ether) and a copolymer of 2,6-dimethylphenol and 2,3,6-trimethylphenol are preferably usable, and poly(2,6-dimethyl-1,4-phenylene ether) is most preferable.

A method for producing the polyphenylene ether resin (A) used in the present invention is not particularly limited.

Exemplary methods for producing the polyphenylene ether resin (A) used in the present invention include a method described in U.S. Pat. No. 3,306,874, wherein 2,6-xylenol is oxidation polymerized using a complex of cuprous salt and amine as a catalyst. Further, methods described in U.S. Pat. Nos. 3,306,875, 3,257,357, 3,257,358, JP-B-52-17880, JP-A-50-51197, and JP-A-63-152628 are also preferable as a method for producing the polyphenylene ether resin (A).

The polyphenylene ether resin (A) of the present invention preferably has a terminal structure represented by the following formula (2).

[Formula 2]

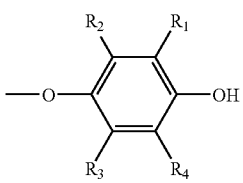

(2)

wherein $R_1$, $R_2$, $R_3$ and $R_4$ are each defined in the same manner as $R_1$, $R_2$, $R_3$ and $R_4$ of the above formula 1.

The polyphenylene ether resin (A) of the present invention more preferably has a terminal structure represented by the following formula (3).

[Formula 3]

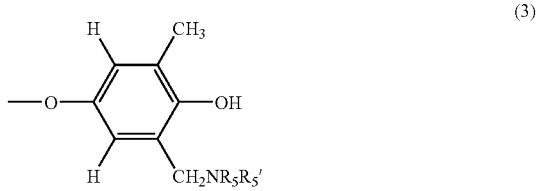

(3)

wherein $R_5$ and $R_5'$ represent hydrogen or an alkyl group.

Exemplary methods for obtaining a polyphenylene ether resin (A) having the terminal structure of the formula (3) include a method wherein oxidative coupling reaction of 2,6-dimethylphenol is performed using a catalyst containing copper or manganese in the presence of a primary or secondary amine. As the above primary or secondary amine, dialkyl amine is preferable, and di-n-butylamine, dimethylamine and diethylamine are more preferably used.

Depending on the purpose, a desired additive may be added in advance to the polyphenylene ether resin (A) of the present invention.

<Polyamide (B) and Polyamide (C)>

A polyamide resin usable as the polyamide (B) of the present invention has a mole fraction between a terminal amino group amount and a terminal carboxyl group amount, that is a ratio of terminal amino groups to terminal carboxyl groups, of 0.20 to 4.0, more preferably 0.2 to 3.0, still more preferably 0.22 to 2.0, most preferably 0.22 to 1.1.

When the polyamide (B) of the present invention has a ratio of terminal amino groups to terminal carboxyl groups of 0.20 to 4.0, a conductive polyamide-polyphenylene ether resin composition excellent in impact resistance, moldability and fluidity can be obtained.

The polyamide (B) of the present invention is added in an amount of 5 to 85 parts by mass, preferably 10 to 70 parts by mass, more preferably 15 to 50 parts by mass based on the total of 100 parts by mass of the conductive polyamide-polyphenylene ether resin composition.

The polyamide (C) of the present invention has a mole fraction between a terminal amino group amount and a terminal carboxyl group amount, that is a ratio of terminal amino groups to terminal carboxyl groups, of 0.05 to 0.19, preferably 0.10 to 0.18, more preferably 0.12 to 0.17.

When the polyamide (C) of the present invention has a ratio of terminal amino groups to terminal carboxyl groups of 0.05 to 0.19, a conductive polyamide-polyphenylene ether resin composition excellent in impact resistance and conductivity can be obtained.

The polyamide (C) of the present invention is added in an amount of 5 to 85 parts by mass, preferably 8 to 50 parts by mass, more preferably 10 to 30 parts by mass based on the total of 100 parts by mass of the conductive polyamide-polyphenylene ether resin composition.

For preparing terminal groups of the polyamide, well-known methods obvious to a skilled person can be used. Examples thereof include a method wherein at least one compound selected from diamine compounds, monoamine compounds, dicarboxylic acid compounds and monocarboxylic acid compounds is added at the time of polymerization for a polyamide resin so as to obtain a predetermined terminal group concentration.

In the present invention, a method described in the following document is used as a quantitative method for terminal amino group amounts and terminal carboxyl group amounts of the polyamides (B) and (C). J. E. Waltz, Guy B. Taylor, "Determination of the molecular Weight of Nylon", Ind. Eng. Chem. Anal. Ed., 19, 448 (1947)

Each of the polyamides (B) and (C) of the present invention is arbitrarily selected from the below-listed polyamide resins usable in the present invention.

In the resin composition of the present invention, the ratio of terminal amino groups to terminal carboxyl groups in the entire polyamides in the composition is preferably 0.15 to 1.0, more preferably 0.16 to 0.7, most preferably 0.17 to 0.3. When this ratio is in the range of 0.15 to 1.0, a resin composition excellent in impact resistance and fluidity can be obtained.

The ratio of terminal amino groups to terminal carboxyl groups in the entire polyamides used in the resin composition of the present invention is given by the following expression.

$$\Sigma((\text{amount of polyamide } i \text{ added}) \times (\text{terminal amino group amount of polyamide } i))/\Sigma((\text{amount of polyamide } i \text{ added}) \times (\text{terminal carboxyl group amount of polyamide } i))$$

As a kind of a polyamide resin usable in the present invention, as long as a polyamide resin has an amide bond (—NH—C(=O)—) in the polymer backbone, any one can be used.

Generally, a polyamide resin can be obtained by, but not limited to, ring opening polymerization of lactams, condensation polymerization of a diamine and a dicarboxylic acid, and condensation polymerization of an aminocarboxylic acid, etc.

The above-mentioned diamine can be generally divided into aliphatic, alicyclic and aromatic diamines, and specific examples thereof include tetramethylenediamine, hexamethylenediamine, undecamethylenediamine, dodecamethylenediamine, tridecamethylenediamine, 2,2,4-trimethylhexamethylene-diamine, 2,4,4-trimethylhexamethylenediamine, 5-methylnonamethylenediamine, 1,3-bisaminomethylcyclohexane, 1,4-bisaminomethylcyclohexane, m-phenylenediamine, p-phenylenediamine, m-xylylenediamine and p-xylylenediamine.

The dicarboxylic acid can be generally divided into aliphatic, alicyclic and aromatic dicarboxylic acids, and specific examples thereof include adipic acid, suberic acid, azelaic acid, sebacic acid, dodecanoic diacid, 1,1,3-tridecanoic diacid, 1,3-cyclohexanedicarboxylic acid, terephthalic acid, isophthalic acid, naphthalenedicarboxylic acid and dimer acid.

Specific examples of the lactam include s-caprolactam, enanthlactam and ω-laurolactam.

Specific examples of the aminocarboxylic acid include ε-aminocaproic acid, 7-aminoheptanoic acid, 8-aminooctanoic acid, 9-aminononanoic acid, 11-aminoundecanoic acid, 12-aminononanoic acid and 13-aminotridecanoic acid.

In the present invention, any copolymerized polyamides obtained by polycondensation of one or a mixture of two or more of these lactams, diamines, dicarboxylic acids or ω-aminocarboxylic acids.

Further, it is suitable to use polymerized polyamides obtained by polymerizing these lactams, diamines, dicarboxylic acids or ω-aminocarboxylic acids in a polymerization reactor to such an extent that oligomers having a low molecular weight are formed, and processing the resultants in an extruder or the like so that they have a high molecular weight.

Polymerization methods of a polyamide resin used in the present invention is not particularly limited, and any of melt-polymerization, interfacial polymerization, solution polymerization, bulk polymerization, solid phase polymerization and combination thereof may be used. Among these, melt-polymerization is preferably used.

Examples of the polyamide resin preferably used in the present invention include polyamide 6; polyamide 6, 6; polyamide 4, 6; polyamide 11; polyamide 12; polyamide 6, 10; polyamide 6, 12; polyamide 6/6, 6; polyamide 6/6, 12; polyamide MXD (m-xylylenediamine), 6; polyamide 6, T; polyamide 6, I; polyamide 6/6, T; polyamide 6/6, I; polyamide 6, 6/6, T; polyamide 6, 6/6, I; polyamide 6/6, T/6, I; polyamide 6, 6/6, T/6, I; polyamide 6/12/6, T; polyamide 6, 6/12/6, T; polyamide 6/12/6, I; and polyamide 6, 6/12/6, I. A plurality of polyamides are copolymerized with an extruder or the like through amide exchange reaction, and thus obtained polyamides can be used.

In the present invention, more preferable polyamide resins are polyamide 6, polyamide 6,6, polyamide 6/6, 6 and a mixture thereof, and most preferable ones are polyamide 6, polyamide 6,6, or a mixture thereof.

The polyamide used in the present invention preferably has a viscosity number of 50 to 300 ml/g, more preferably 80 to 180 ml/g, measured in 96% sulfuric acid in accordance with ISO 307.

In the present invention, even when polyamide resins having viscosity numbers out of the above range are mixed, the mixture can be used with no problem if the mixture has a viscosity number within the above range.

Examples of the mixture include a mixture of a polyamide resin with a viscosity number of 340 ml/g and a polyamide resin with a viscosity number of 40 ml/g.

In these cases, as long as the mixing ratio of the polyamides is set so that the viscosity number of the mixture falls within the above range, the mixture can be used. Whether the viscosity number of this mixture falls within the above range or not can be easily determined by dissolving polyamide resins at a weight ratio for mixing in 96% sulfuric acid and measuring a viscosity number in accordance with ISO 307.

A particularly preferable mixing condition for polyamide resins is that each polyamide resin has a viscosity of 90 to 150 ml/g and polyamide resins each having a different viscosity number are mixed. In the present invention, a known metal stabilizer as described in JP-A-1-163262 can be used with no problem for the purpose of improving heat resistant stability of a polyamide.

Among these metal stabilizer, CuI, $CuCl_2$, copper acetate and cerium stearate are particularly preferably used. In addition, alkyl metal halides typified by, for example, potassium iodide and potassium bromide, can be also suitably used. As a matter of course, these can be used in combination.

The metal stabilizer and/or the alkyl metal halide are added in an amount of preferably 0.001 to 1 parts by mass based on the total of 100 parts by mass of polyamides.

In addition to the above-mentioned metal stabilizer, a known organic stabilizer can be used in the present invention with no problem. Examples of the organic stabilizer include hindered phenol antioxidants typified by IRGANOX 1098, etc., phosphorus processed heat stabilizers typified by IRGAFOS 168, etc., lactone processed heat stabilizers typified by HP-136, sulfur heat resistant stabilizers and hindered amine photo-stabilizers.

Among these organic stabilizers, hindered phenol antioxidants, phosphorus processed heat stabilizers and combinations thereof are more preferable.

These organic stabilizers are added in an amount of preferably 0.001 to 1 parts by mass based on the total of 100 parts by mass of the polyamides (B) and (C).

In addition to the above, a known additive that can be added to the polyamide may be added in an amount of less than 10 parts by mass based on the total of 100 parts by mass of the polyamides (B) and (C).

<Conductive Filler (D)>

A conductive filler (D) of the present invention is an inorganic filler that imparts conductivity by its addition to plastic. Examples of the conductive filler include carbon black, carbon nanotube, carbon fibers, carbon whiskers, metal fibers, conductive potassium titanate whiskers, metal particles, and metal-coated fibers, particles and flakes.

A conductive filler for the present invention is preferably carbon black and carbon nanotube. A conductive filler for the present invention is more preferably carbon black.

As the carbon black usable in the present invention, Ketjen Black (EC, EC-600JD) available from Ketjen Black International Company, for example, is preferable.

The conductive filler (D) of the present invention is added in an amount of 0.1 to 10 parts by mass, preferably 0.5 to 7 parts by mass, more preferably 1 to 5 parts by mass based on the total of 100 parts by mass of the conductive polyamide-polyphenylene ether resin composition.

<Master Batch (E)>

A master batch (E) of the present invention can be obtained by melt-kneading the conductive filler (D) and the polyamide (C) in advance.

A melt-kneading method is not particularly limited, but the conductive filler (D) and the polyamide (C) can be dry-blended and then melt-kneaded using a twin screw extruder.

Also, a method wherein the polyamide (C) is fed through a main feeding inlet of a twin screw extruder and the conductive filler (D) is fed through a side feeder after the polyamide (C) is melt, can be preferably employed.

Further, a high concentration of conductive filler (D) and the polyamide (C) can be melt-kneaded by using a batch-type melt-kneading machine such as a Banbury mixer, thus enabling the obtainment of a high concentration of master batch (E).

The concentration of the conductive filler (D) in the master batch (E) is preferably in the range of 5 to 30% by mass. When the concentration of the conductive filler (D) in the master batch (E) is in the range of 5 to 30% by mass, an excellent balance of conductivity, rigidity and fluidity is obtained. Further, the range is preferably from 7 to 25% by mass, particularly preferably from 10 to 20% by mass.

The method for producing the conductive polyamide-polyphenylene ether resin composition of the present invention is characterized by melt-kneading the master batch (E) obtained by melt-kneading the conductive filler (D) and the polyamide (C) in advance, the polyphenylene ether resin (A), the polyamide (B) and a compatibilizer (F).

The conductive polyamide-polyphenylene ether resin composition obtained by the method of the present invention has the conductive filler (D) present in a continuous phase mainly composed of the polyamide (C), and thus can effectively impart a electrostatic painting property.

<Compatibilizer (F)>

As a compatibilizer (F) usable in the present invention, one having in the molecular structure thereof at least one C—C double bond or triple bond, and at least one of an acyloxide group, an imino group, an imide group, and a glycidyl group, can be used.

Compounds used as the compatibilizer (F) of the present invention are, for example, maleimide, N-alkyl maleimide, N-allyl maleimide, N-alkyl maleamic acid, N-allyl maleamic acid, maleic anhydride, maleic acid, fumaric acid, phenylmaleimide, itaconic acid, glycidyl methacrylate, and glycidyl acrylate.

The compatibilizer (F) of the present invention is preferably maleic anhydride, maleic acid, fumaric acid, phenylmaleimide or itaconic acid.

As a compatibilizer (F) usable in the present invention, a compound selected from polycarboxylic acids and/or denatured products thereof can be used.

The compatibilizer (F) of the present invention is preferably a polycarboxylic acid such as citric acid and malic acid or a derivative of citric acid or malic acid.

<PA-PPE Composition (G)>

A polyamide-polyphenylene ether resin composition (PA-PPE) (G) of the present invention is a resin composition prepared by compatibilization of the polyphenylene ether resin (A) and the polyamide (B).

The PA-PPE composition (G) of the present invention can be obtained by melt-kneading the polyphenylene ether resin (A), the polyamide (B) and the compatibilizer (F) in advance.

The PA-PPE composition (G) is preferably obtained by melt-heating the polyphenylene ether resin (A) and the compatibilizer (F) in advance, adding the polyamide (B) thereto, and further melt-kneading the resultant product.

<Functionalized PPE (H)>

A functionalized polyphenylene ether resin composition (functionalized PPE) (H) of the present invention can be obtained by melt-kneading the polyphenylene ether resin (A) and the compatibilizer (F) in advance.

The functionalized PPE (H) of the present invention can be obtained by reacting by heat 100 parts by mass of the polyphenylene ether resin (A) with 0.1 to 10 parts by mass of the compatibilizer (F).

When the compatibilizer (F) is present in this range, a sufficient amount of functional groups and a smaller amount of unreacted compatibilizer (F) remain in modified polyphenylene ether resin, thus preventing silver streak, which is a problem at the time of molding.

A preferable method for producing a conductive polyamide-polyphenylene ether resin composition of the present invention includes: melt-kneading the polyphenylene ether resin (A), the polyamide (B) and the compatibilizer (F) in advance to obtain a PA-PPE composition (G); and further melt-kneading the obtained PA-PPE composition (G) and the master batch (E).

A very preferable method for producing a conductive polyamide-polyphenylene ether resin composition of the present invention includes: melt-kneading the polyphenylene ether resin (A) and the compatibilizer (F) in advance to obtain a functionalized PPE (H); and mixing and melt-kneading the obtained functionalized PPE (H) with the polyamide (B) and the master batch (E).

<Elastomer>

An elastomer is preferably added to the conductive polyamide-polyphenylene ether resin composition of the present invention to impart impact resistance to the composition.

The elastomer is added to the conductive polyamide-polyphenylene ether resin composition of the present invention in an amount of 1 to 50 parts by mass, preferably 3 to 30 parts by mass, more preferably 5 to 20 parts by mass based on the total of 100 parts by mass of the conductive polyamide-polyphenylene ether resin composition.

An elastomer preferably usable for the conductive polyamide-polyphenylene ether resin composition of the present invention is an elastomer composed of a block copolymer containing a styrene compound, that is: a block copolymer composed of a polymer block mainly having at least one styrene compound and a polymer block mainly having at least one conjugated diene compound; or a hydrogenated styrene compound-containing block copolymer, wherein unsaturated bonds in a polymer block mainly having the conjugated diene compound in the block copolymer are hydrogenated.

In the polymer block mainly having the styrene compound, the term "mainly having" means that the block contains a styrene compound in an amount of 50% by mass or more, preferably 70% by mass or more, more preferably 80% by mass or more, most preferably 90% by mass or more. The same applies to the term "mainly having" in the polymer block mainly having the conjugated diene compound. It means that the block contains a conjugated diene compound in an amount of 50% by mass or more, preferably 70% by mass or more, more preferably 80% by mass or more, most preferably 90% by mass or more.

In this case, even when the block has a small amount of conjugated diene compound or other compound randomly bonded to the styrene compound, for example, the block is regarded as a block copolymer mainly having a styrene compound as long as 50% by mass of the block is formed of the styrene compound. Also, the same applied to the conjugated diene compound.

Specific examples of the styrene compound include styrene, α-methylstyrene and vinyltoluene, and at least one compound selected therefrom is used. Among these, styrene is particularly preferable.

Specific examples of the conjugated diene compound include butadiene, isoprene, piperylene, and 1,3-pentadiene, and at least one compound selected therefrom is use. Among these, butadiene, isoprene and the combination thereof are preferable.

In the styrene compound-containing block copolymer, a microstructure of a conjugated diene compound block contains 1,2-vinyl or the combination of 1,2-vinyl and 3,4-vinyl in a ratio of preferably 5 to 80%, more preferably 10 to 50%, most preferably 15 to 40%.

In the present invention, the styrene compound-containing block copolymer is a block copolymer having a bonding type selected from a-b, a-b-a and a-b-a-b, wherein (a) is a polymer block mainly having a styrene compound and (b) is a polymer block mainly having a conjugated diene compound. Among these, a-b-a bonding type is preferable. A mixture of these bonding types may be used.

Further, the styrene compound-containing block copolymer used in the present invention is preferably a hydrogenated styrene compound-containing block copolymer.

The hydrogenated styrene compound-containing block copolymer is obtained by hydrogenating the block copolymer of the styrene compound and the conjugated diene compound, so that aliphatic double bonds in the polymer block mainly having the conjugated diene compound are hydrogenated in a ratio of 50% or more, preferably 80% or more, most preferably 98% or more.

In addition, the hydrogenated styrene compound-containing block copolymer usable in the present invention desirably has a number average molecular weight of not less than 200,000 and not more than 300,000. A hydrogenated block copolymer having a molecular weight out of the above range can be used. However, in order to exhibit a high impact property with a small amount addition, it is desirable to use even a small amount of a hydrogenated block copolymer having the above range.

The number average molecular weight referred to in the present invention is obtained by using a gel permeation chromatography measurement apparatus (GPC SYSTEM 21, manufactured by Showa Denko K.K.) and an ultraviolet spectral detector (UV-41, manufactured by Showa Denko K.K.) and converting a measured value based on the polystyrene standard (solvent: chloroform; temperature: 40° C.; column: sample side (K-G, K-800RL, K-800R), reference side (K-805L×2); flow rate: 10 ml/min; measurement wavelength: 254 nm; pressure: 15 to 17 kg/cm$^2$). At times, a low molecular weight component owing to catalyst deactivation in the course of polymerization may be detected. In such a case, the low molecular weight component is not incorporated in the molecular weight calculation. Usually, an accurately calculated molecular weight distribution (weight average molecular weight/number average molecular weight) ranges from 1.0 to 1.2.

A styrene compound-containing block copolymer is usually produced by living anion polymerization, and a copolymer having a very narrow molecular weight distribution (Mw/Mn=about 1.0 to 1.2) can be obtained.

Further, as long as the feature of the present invention is not neglected, a styrene compound-containing block copolymer may be mixed for use, which has a different bonding type, a different styrene compound mixed, a different conjugated diene compound mixed, a different content amount of 1,2-bonding vinyl or 1,2-bonding vinyl and 3,4-bonding vinyl in total, a different content amount of styrene compound component, a different hydrogenation ratio, or the like. As a matter of course, there is no problem on addition of a block copolymer other than the styrene compound-containing block copolymer defined in the present specification.

Furthermore, the styrene compound-containing block copolymer used in the present invention may be a wholly or partially modified styrene compound-containing block copolymer.

The modified styrene compound-containing block copolymer mentioned herein is a styrene compound-containing block copolymer that is modified with the compatibilizer (F).

As a method for producing the modified styrene compound-containing block copolymer, there are provided, for example:

(1) a method for reacting it with the modifying compound by melt-kneading in the presence or absence of a radical initiator, and at a temperature of not lower than a softening temperature of the styrene compound-containing block copolymer and not higher than 250° C.;

(2) a method for reacting in a solution the styrene compound-containing block copolymer with the compatibilizer (F) in a presence or absence of a radical initiator, at a temperature of not higher than the softening temperature of the styrene compound-containing block copolymer; and (3) a method for reacting the styrene compound-containing block copolymer with the compatibilizer (F) without melting them in a presence or absence of a radical initiator, at a temperature of not higher than the softening temperature of the styrene compound-containing block copolymer.

Any of these methods may be used, but the method of (1) is preferable, and further in the method of (1), conducted in the presence of a radical initiator, is most preferable.

Further, a styrene compound-containing block copolymer that is preliminarily mixed with an oil having a paraffin as a main component thereof may be used in the present invention. Preliminary mixing of the oil having a paraffin as a main component can improve the workability of the resin composition.

<Other Additives>

An additive used for the conductive polyamide-polyphenylene ether resin composition of the present invention is, for example, a heat stabilizer, an oxidation inhibitor, an UV absorbent, a surfactant, a lubricant, a filler, a polymer additive, dialkyl peroxide, diacyl peroxide, peroxy, peroxycarbonate, hydroperoxide, peroxyketal, an inorganic filler (talc, kaolin, xonotlite, wollastonite, titanium oxide, potassium titanate, a carbon fiber, a glass fiber, etc.), known silane coupling agents to enhance affinity between an inorganic filler and a resin, a flame retardant (a halogenated resin, a silicone type flame retardant, magnesium hydroxide, aluminium hydroxide, an organic phosphoric ester compound, ammonium polyphosphate, red phosphorus, etc.), a fluorine type polymer showing a preventing effect of dropping, a plasticizer (an oil, a low molecular weight polyolefin, a polyethylene glycol, a fatty ester, etc.), a flame retardant assistant such as antimony trioxide, a colorant such as carbon black, an antistatic agent, various kinds of a peroxide, zinc oxide, zinc sulfide, an antioxidant, an ultraviolet absorber, and a light stabilizer.

These components are added in a specific amount below 100 parts by mass in the total of additional components based on the total of 100 parts by mass of the polyamide and the polyphenylene ether resin.

Further, to stabilize the polyphenylene ether resin, various known stabilizers can be suitably used. Examples of the stabilizer include metal stabilizers such as zinc oxide and zinc sulphide, and organic stabilizers such as hindered phenol stabilizers, phosphorous stabilizers and hindered amine stabilizers. These are preferably blended in an amount of less than 5 parts by mass based on 100 parts by mass of the polyphenylene ether resin.

A suitable form for applying the conductive polyamide-polyphenylene ether resin composition of the present invention to various molding methods is polyphenylene ether resin pellet, which is obtained by melt-kneading and palletizing the conductive polyamide-polyphenylene ether resin composition of the present invention.

A conductive resin composition obtained by the production method of the present invention has a volume resistivity defined in Examples of $1.0 \times 10^6$ or less.

Specific examples of a processing apparatus for melt-kneading the conductive polyamide-polyphenylene ether resin composition of the present invention include a single screw extruder, a twin screw extruder, a roll, a kneader, a Brabender Plastograph and a Banbury mixer. Among these, a twin screw extruder is preferably used. A processing apparatus preferably used in the present invention is a twin screw extruder that is equipped with an upstream feeding port and one or more downstream feeding port; and a screw with a diameter of 40 mm or more and a L/D of 30 or more.

In this case, the processing temperature of a cylinder or the like of the processing apparatus is not particularly limited, and conditions for obtaining a suitable composition are usually determined arbitrarily from 240 to 360° C.

EXAMPLES

Hereinafter, the present invention will be explained in detail by referring to Examples and Comparative Examples.
<Raw Material>
Raw materials used in the Examples are as follows.
<Polyphenylene Ether Resin (A)>
In the Examples of the present invention, poly(2,6-dimethyl-phenylene oxide) (hereinafter referred to as PPE-A) having a reduced viscosity of 0.42 dl/g (measured using an Ubbelohde viscosimeter and 0.5 g/dl chloroform solution at 30° C.).
<Polyamide (B)>
In the Examples and Comparative Examples of the present invention, used as the polyamide (B) were: polyamide-6,6 (hereinafter referred to as PA-B1) having a viscosity number of 135 ml/g, a terminal amino group amount of 61.9 (μmol/g), a terminal carboxyl group amount of 63.1 (μmol/g), and a ratio of terminal amino groups to terminal carboxyl groups of 0.98; polyamide-6,6 (hereinafter referred to as PA-B2) having a viscosity number of 129 ml/g, a terminal amino group amount of 30.9 (μmol/g), a terminal carboxyl group amount of 93.1 (μmol/g), and a ratio of terminal amino groups to terminal carboxyl groups of 0.30; polyamide-6,6 (hereinafter referred to as PA-B3) having a viscosity number of 132 ml/g, a terminal amino group amount of 50.0 (μmol/g), a terminal carboxyl group amount of 80.0 (μmol/g), and a ratio of terminal amino groups to terminal carboxyl groups of 0.625; polyamide-6,6 (hereinafter referred to as PA-B4) having a viscosity number of 138 ml/g, a terminal amino group amount of 94.3 (μmol/g), a terminal carboxyl group amount of 37.7 (μmol/g), and a ratio of terminal amino groups to terminal carboxyl groups of 2.50; and polyamide-6,6 (hereinafter referred to as PA-B5) having a viscosity number of 130 ml/g, a terminal amino group amount of 106.6 (μmol/g), a terminal carboxyl group amount of 25.4 (μmol/g), and a ratio of terminal amino groups to terminal carboxyl groups of 4.20.
<Polyamide (C)>
In the Examples and Comparative Examples of the present invention, used as the polyamide (C) were: polyamide-6,6 (hereinafter referred to as PA-C1) having a viscosity number of 130 ml/g, a terminal amino group amount of 18.3 (μmol/g), a terminal carboxyl group amount of 114.7 (μmol/g), and a ratio of terminal amino groups to terminal carboxyl groups of 0.16; and polyamide-6,6 (hereinafter referred to as PA-C2) having a viscosity number of 135 ml/g, a terminal amino group amount of 13.5 (μmol/g), a terminal carboxyl group amount of 112.5 (μmol/g), and a ratio of terminal amino groups to terminal carboxyl groups of 0.12.
<Conductive Filler (D)>
In the Examples of the present invention, Ketjen Black (EC, EC-600JD), a carbon black manufactured by Ketjen Black International Company was used as the conductive filler (D).
<Compatibilizer (F)>
In the Examples of the present invention, maleic anhydride was used as the compatibilizer (F).
<Elastomer>
In the Examples of the present invention, used as the elastomer was a polystyrene-polyethylenebutylene-polystyrene block copolymer (SEBS) or KratonG1651 (product name), a kind of styrene compound-containing block copolymer manufactured by Kraton Polymers Japan (number average molecular weight: approximately 250,000) (hereinafter referred to as SEBS).
<Twin Screw Extruder>
In the Examples of the present invention, a twin screw extruder or ZSK40MC (manufactured by Coperion Corporation (Germany)) having an L/D of 44 and the screws rotating in the same direction was used. The temperature for the entire of a cylinder was set to 300° C. and the temperature for a die was set to 280° C. Further, vent ports were disposed at two locations at approximately 0.35 and 0.80 from the upstream when the whole length of a screw is defined as 1.0. Suction under reduced pressured was performed at the upstream vent port and a side feeder was installed at the downstream vent port.
<Production of Master Batch (E)>
In the Examples of the present invention, a twin screw extruder was used. PA-C1 or PA-C2 was volumetrically fed from a main feeding port of the extruder at a rate of 90 parts by mass per hour. At the same time, Ketjen Black (EC, EC-600JD) was volumetrically fed from the side feeder at a rate of 10 parts by mass per hour. MB-C1 and MB-C2 obtained after melt-kneading were used.

In the same manner, a twin screw extruder was used in the Comparative Examples of the present invention. PA-B2 or PA-B3 was volumetrically fed from a main feeding port of the extruder at a rate of 90 parts by mass per hour, and simultaneously Ketjen Black was volumetrically fed from the side feeder at a rate of 10 parts by mass per hour. MB-B2 and MB-B3 obtained after melt-kneading were used.

<Production of PA-PPE Composition (G)>

In the Examples of the present invention, a twin screw extruder was used. PPE-A and maleic anhydride were volumetrically fed from a main feeding port of the extruder at rates of 35 parts by mass and 0.5 parts by mass per hour, respectively. At the same time, PA-B1 or PA-B2 was volumetrically fed from a side feeder at a rate of 35 parts by mass per hour. PA/PPE composition and PA/PPE composition A2 obtained after melt-kneading were used.

<Production of Functionalized PPE (H)>

In the Examples of the present invention, a twin screw extruder was used. PPE-A and maleic anhydride were volumetrically fed from a main feeding port of the extruder at rates of 35 parts by mass and 0.5 parts by mass per hour, respectively. Functionalized PPE-H1 obtained by melt-kneading was used.

<Preparation of Multipurpose Specimens>

With respect to the conductive polyamide-polyphenylene ether resin composition of the present invention obtained in the Examples, multipurpose specimens defined in ISO3167 were prepared in accordance with ISO294, using an injection molding machine IS80EPN manufactured Toshiba Machine Co., Ltd. with the conditions: cylinder temperature of 280° C.; mold temperature of 80° C.; and normal injection speed.

<Measurement of SSP>

With respect to the conductive polyamide-polyphenylene ether resin composition of the present invention obtained in the Examples, using the above-mentioned injection molding machine and mold with the same temperature conditions set as above, the conductive polyamide-polyphenylene ether resin composition of the present invention was injection-molded as an injection pressure was increased gradually. Then, a pressure (SSP), at which the mold was almost filled with the composition, was measured for the evaluation of fluidity.

<Measurement of Izod Impact Strength>

Using the above multipurpose specimens, the measurement was conducted in accordance with ISO180/1A.

<Measurement of Flexural Modulus>

Using the above multipurpose specimens, the measurement was conducted in accordance with ISO178.

<Measurement of Volume Resistivity>

The volume resistivity on a narrow parallel part of the multipurpose specimen was measured.

Especially, a test specimen, both sides of which had been scarred (depth: approximately 0.3 mm) in advance with a cutter knife, was immersed in a dry ice/methanol mixture having a temperature of −75 to −70° C. for 1 hour, and then broken off by hand. A break test specimen having a length of approximately 70 mm and brittle broken surfaces at both ends was obtained.

A silver paste dispersed in petroleum ether was applied onto both broken surfaces of the test specimen at both sides and the test specimen was allowed to stand for 30 min. at room temperature. Thereafter, the test specimen was dried at 80° C. for 20 min. and further allowed to stand for 60 min. in a thermostatic chamber at 23° C. and 50% RH. The thus-obtained specimen was used for volume resistivity measurement.

The resistance value ρ between both sides of the test specimen, onto which the silver paste had been applied, was measured at an applied voltage of 100 V for 30 sec., using a digital ultra-high resistance/micro current meter R8340A manufactured by Advantest Corporation.

The measurement was performed in the thermostatic chamber. The volume resistivity was obtained in accordance with the following expression.

$$(\text{Volume resistivity}) = (\text{Resistance value } \rho) \times (\text{cross section area of test specimen})/(\text{length of test specimen})$$

Example 1

Using a twin screw extruder, PPE-A, PA-B1, SEBS and maleic anhydride were volumetrically fed from a main feeding port of the extruder at rates of 35, 35, 12 and 0.5 parts by mass per hour, respectively, and simultaneously, MB-C1 was volumetrically fed from a side feeder at a rate of 20 parts by mass per hour, then preparing a conductive polyamide-polyphenylene ether resin composition by melt-kneading.

The screw rotation speed of the twin screw extruder was set at 240 rpm (ratio of discharge rate/screw rotation speed=0.25). The entire amount of raw material fed per hour was approximately 60 kg/h. A string shape of strand discharged from a dice after melt-kneading was cut with a strand cutter, and pellets of the conductive polyamide-polyphenylene ether resin composition were obtained.

Using the pellets, multipurpose test specimens were prepared, and SSP, Izod impact strength, flexural modulus and volume resistivity were measured.

Example 2

Using a twin screw extruder, PPE-A, PA-B1, SEBS and maleic anhydride were volumetrically fed from a main feeding port of the extruder at rates of 35, 35, 10 and 0.5 parts by mass per hour, respectively, and simultaneously, MB-C1 was volumetrically fed from a side feeder at a rate of 20 parts by mass per hour, then preparing a conductive polyamide-polyphenylene ether resin composition by melt-kneading.

The screw rotation speed of the twin screw extruder was set at 240 rpm (ratio of discharge rate/screw rotation speed=0.25). The entire amount of raw material fed per hour was approximately 58 kg/h.

In the same manner as in Example 1, multipurpose test specimens were prepared, and SSP, Izod impact strength, flexural modulus and volume resistivity were measured.

Example 3

Using a twin screw extruder, PA/PPE composition A1 and SEBS were volumetrically fed from a main feeding port of the extruder at rates of 70 and 8 parts by mass per hour, and simultaneously, MB-C1 was volumetrically fed from a side feeder at a rate of 20 parts by mass per hour, then preparing a conductive polyamide-polyphenylene ether resin composition by melt-kneading.

The screw rotation speed of the twin screw extruder was set at 240 rpm (ratio of discharge rate/screw rotation speed=0.25). The entire amount of raw material fed per hour was approximately 60 kg/h.

In the same manner as in Example 1, multipurpose test specimens were prepared, and SSP, Izod impact strength, flexural modulus and volume resistivity were measured.

Example 4

Using a twin screw extruder, functionalized PPE-H, PA-B1 and SEBS were volumetrically fed from a main feeding port of the extruder at rates of 35.5, 39, and 8 parts by mass per hour, respectively, and simultaneously, MB-C1 was volumetrically fed from a side feeder at a rate of 16 parts by mass per hour, then preparing a conductive polyamide-polyphenylene ether resin composition by melt-kneading.

The screw rotation speed of the twin screw extruder was set at 240 rpm (ratio of discharge rate/screw rotation speed=0.25). The entire amount of raw material fed per hour was approximately 62 kg/h.

In the same manner as in Example 1, multipurpose test specimens were prepared, and SSP, Izod impact strength, flexural modulus and volume resistivity were measured.

Example 5

Using a twin screw extruder, PA-PPE composition A2, PA-B2 and SEBS were volumetrically fed from a main feeding port of the extruder at rates of 70, 4 and 12 parts by mass per hour, respectively, and simultaneously, MB-C1 was volumetrically fed from a side feeder at a rate of 20 parts by mass per hour, then preparing a conductive polyamide-polyphenylene ether resin composition by melt-kneading.

The screw rotation speed of the twin screw extruder was set at 240 rpm (ratio of discharge rate/screw rotation speed=0.25). The entire amount of raw material fed per hour was approximately 60 kg/h.

In the same manner as in Example 1, multipurpose test specimens were prepared, and SSP, Izod impact strength, flexural modulus and volume resistivity were measured.

Example 6

Using a twin screw extruder, PPE-A, PA-B4, SEBS and maleic anhydride were volumetrically fed from a main feeding port of the extruder at rates of 35, 35, 10 and 0.5 parts by mass pre hour, respectively, and simultaneously, MB-C2 was volumetrically fed from a side feeder at a rate of 20 parts by mass per hour, then preparing a conductive polyamide-polyphenylene ether resin composition by melt-kneading.

The screw rotation speed of the twin screw extruder was set at 240 rpm (ratio of discharge rate/screw rotation speed=0.25). The entire amount of raw material fed per hour was approximately 58 kg/h.

In the same manner as in Example 1, multipurpose test specimens were prepared, and SSP, Izod impact strength, flexural modulus and volume resistivity were measured.

Comparative Example 1

Using a twin screw extruder, PPE-A, PA-C1, SEBS and maleic anhydride were volumetrically fed from a main feeding port of the extruder at rates of 35, 35, 10 and 0.5 parts by mass per hour, respectively, and simultaneously, MB-C1 was volumetrically fed from a side feeder at a rate of 20 parts by mass per hour, then preparing a conductive polyamide-polyphenylene ether resin composition by melt-kneading.

The screw rotation speed of the twin screw extruder was set at 240 rpm (ratio of discharge rate/screw rotation speed=0.25). The entire amount of raw material fed per hour was approximately 58 kg/h.

In the same manner as in Example 1, multipurpose test specimens were prepared, and SSP, Izod impact strength, flexural modulus and volume resistivity were measured.

Comparative Example 2

Using a twin screw extruder, PPE-A, PA-B1, SEBS and maleic anhydride were volumetrically fed from a main feeding port of the extruder at rates of 35, 35, 10 and 0.5 parts by mass per hour, respectively, and simultaneously, MB-B2 was volumetrically fed from a side feeder at a rate of 20 parts by mass per hour, then preparing a conductive polyamide-polyphenylene ether resin composition by melt-kneading.

The screw rotation speed of the twin screw extruder was set at 240 rpm (ratio of discharge rate/screw rotation speed=0.25). The entire amount of raw material fed per hour was approximately 62 kg/h.

In the same manner as in Example 1, multipurpose test specimens were prepared, and SSP, Izod impact strength, flexural modulus and volume resistivity were measured.

Comparative Example 3

Using a twin screw extruder, PPE-A, PA-B5, SEBS and maleic anhydride were volumetrically fed from a main feeding port of the extruder at rates of 35, 35, 10 and 0.5 parts by mass per hour, respectively, and simultaneously, MB-C1 was volumetrically fed from a side feeder at a rate of 20 parts by mass per hour, then preparing a conductive polyamide-polyphenylene ether resin composition by melt-kneading.

The screw rotation speed of the twin screw extruder was set at 240 rpm (ratio of discharge rate/screw rotation speed=0.25). The entire amount of raw material fed per hour was approximately 56 kg/h.

In the same manner as in Example 1, multipurpose test specimens were prepared, and SSP, Izod impact strength, flexural modulus and volume resistivity were measured.

Comparative Example 4

Using a twin screw extruder, PPE-A, PA-B3, SEBS and maleic anhydride were volumetrically fed from a main feeding port of the extruder at rates of 35, 35, 10 and 0.5 parts by mass per hour, respectively, and simultaneously, MB-B3 was volumetrically fed from a side feeder at a rate of 20 parts by mass per hour, then preparing a conductive polyamide-polyphenylene ether resin composition by melt-kneading.

The screw rotation speed of the twin screw extruder was set at 240 rpm (ratio of discharge rate/screw rotation speed=0.25). The entire amount of raw material fed per hour was approximately 50 kg/h.

In the same manner as in Example 1, multipurpose test specimens were prepared, and SSP, Izod impact strength, flexural modulus and volume resistivity were measured.

<Results>

With respect to Examples 1 to 6 and Comparative Examples 1 to 4, results of SSP, Izod impact strength, flexural modulus and volume resistivity are shown in Table 1.

TABLE 1

| | $NH_2/COOH$ in PA | Example 1 | Example 2 | Example 3 | Example 4 | Example 5 | Example 6 | Comparative Example 1 | Comparative Example 2 | Comparative Example 3 | Comparative Example 4 |
|---|---|---|---|---|---|---|---|---|---|---|---|
| PPE-A | | 34.1 | 34.8 | 35.5 | 35.5 | 34.1 | 34.8 | 34.1 | 35.5 | 34.8 | 34.8 |
| Maleic anhydride | | 0.5 | 0.5 | 0.5 | 0.5 | 0.5 | 0.5 | 0.5 | 0.5 | 0.5 | 0.5 |
| SEBS | | 11.7 | 10.0 | 8.1 | 8.1 | 11.7 | 10.0 | 11.7 | 8.1 | 10.0 | 10.0 |
| PA-B1 | 0.98 | 34.1 | 34.8 | 35.5 | 39.6 | — | — | — | 35.5 | — | — |
| PA-B2 | 0.30 | — | — | — | — | 34.1 | — | — | — | — | — |
| PA-B3 | 0.63 | — | — | — | — | — | — | — | — | — | 34.8 |
| PA-B4 | 2.50 | — | — | — | — | — | 34.8 | — | — | — | — |
| PA-B5 | 4.20 | — | — | — | — | — | — | — | — | 34.8 | — |
| PA-C1 | 0.16 | — | — | — | — | — | — | 34.1 | — | — | — |
| MB-C1 | 0.16 | 19.5 | 19.9 | 20.3 | 16.2 | — | 19.9 | 19.5 | — | 19.9 | — |
| MB-C2 | 0.12 | — | — | — | — | 19.5 | — | — | — | — | — |
| MB-B2 | 0.30 | — | — | — | — | — | — | — | 20.3 | — | — |
| MB-B3 | 0.63 | — | — | — | — | — | — | — | — | — | 19.9 |
| | | 100.0 | 100.0 | 100.0 | 100.0 | 100.0 | 100.0 | 100.0 | 100.0 | 100.0 | 100.0 |
| EC/PA-PPE | | 0.02 | 0.02 | 0.02 | 0.02 | 0.02 | 0.02 | 0.02 | 0.02 | 0.02 | 0.02 |
| $NH_2/COOH$ in the entire PA | | 0.56 | 0.56 | 0.56 | 0.63 | 0.25 | 1.01 | 0.16 | 0.68 | 1.29 | 0.63 |
| Izod impact strength | $kJ/m^2$ | 28 | 25 | 18 | 25 | 26 | 24 | 8 | 17 | 27 | 26 |
| Flexural modulus | Mpa | 2300 | 2500 | 2700 | 2800 | 2800 | 2400 | 1900 | 2300 | 2100 | 2200 |
| SSP | $kg/cm^2$ | 32 | 31 | 31 | 32 | 24 | 35 | 22 | 41 | 52 | 55 |
| Volume resistivity | $\Omega \cdot cm$ | 4.50E+04 | 4.00E+04 | 3.00E+04 | 2.00E+05 | 1.80E+04 | 3.50E+04 | 3.00E+05 | 1.00E+06 | 3.00E+05 | 4.00E+05 |

INDUSTRIAL APPLICABILITY

The conductive polyamide-polyphenylene ether resin composition of the present invention has a conductive filler effectively dispersed in a polyamide-polyphenylene ether resin composition. The conductive polyamide-polyphenylene ether resin composition is economical and excellent in balance of fluidity and mechanical properties such as impact resistance and rigidity in comparison with the conventional arts, and thus can be suitably used as materials for electronics and electricity, automobile, construction and other industries.

The invention claimed is:

1. A method for producing a conductive polyamide-polyphenylene ether resin composition comprising: 10 to 90 parts by mass of polyphenylene ether resin (A); 5 to 85 parts by mass of a polyamide (B) having a ratio of terminal amino groups to terminal carboxyl groups of 0.20 to 4.0; 5 to 85 parts by mass of a polyamide (C) having a ratio of terminal amino groups to terminal carboxyl groups of 0.05 to 0.19; and 0.1 to 10 parts by mass of a conductive filler (D),
wherein the method comprises melt-kneading of the component (A), the component (B), a compatibilizer (F) and a master batch (E) obtained by melt-kneading of the component (D) and the component (C) in advance.

2. The method according to claim 1, wherein the method comprises melt-kneading of the component (A), the component (B) and the compatibilizer (F) in advance to obtain a polyamide-polyphenylene ether resin composition (G), and melt-kneading of the component (E) and the component (G).

3. The method according to claim 1, wherein the method comprises melt-kneading of the component (A) and the component (F) in advance to obtain a functionalized polyphenylene ether resin composition (H), and melt-kneading of the component (B), the component (E) and the component (H).

4. The method according to claim 1, wherein a ratio of terminal amino groups to terminal carboxyl groups of the entire polyamide in the composition is 0.15 to 1.0.

5. The method according to claim 4, wherein the ratio of terminal amino groups to terminal carboxyl groups of the entire polyamide in the composition is 0.16 to 0.7.

6. The method according to claim 5, wherein the ratio of terminal amino groups to terminal carboxyl groups of the entire polyamide in the composition is 0.17 to 0.3.

7. The method according to claim 2, wherein a ratio of terminal amino groups to terminal carboxyl groups of the entire polyamide in the composition is 0.15 to 1.0.

8. The method according to claim 7, wherein the ratio of terminal amino groups to terminal carboxyl groups of the entire polyamide in the composition is 0.16 to 0.7.

9. The method according to claim 8, wherein the ratio of terminal amino groups to terminal carboxyl groups of the entire polyamide in the composition is 0.17 to 0.3.

10. The method according to claim 3, wherein a ratio of terminal amino groups to terminal carboxyl groups of the entire polyamide in the composition is 0.15 to 1.0.

11. The method according to claim 10, wherein the ratio of terminal amino groups to terminal carboxyl groups of the entire polyamide in the composition is 0.16 to 0.7.

12. The method according to claim 11, wherein the ratio of terminal amino groups to terminal carboxyl groups of the entire polyamide in the composition is 0.17 to 0.3.

* * * * *